United States Patent [19]

Everts

[11] 4,342,236
[45] Aug. 3, 1982

[54] CRANKSHAFT WITH LAMINATED COUNTERWEIGHT

[76] Inventor: Robert G. Everts, 2301 W. Colt Rd., Chandler, Ariz. 85224

[21] Appl. No.: 199,629

[22] Filed: Oct. 22, 1980

Related U.S. Application Data

[63] Continuation of Ser. No. 946,216, Sep. 27, 1978, abandoned.

[51] Int. Cl.³ .............................................. F16C 3/04
[52] U.S. Cl. .................................................... 74/603
[58] Field of Search ........................... 74/595, 598, 603

[56] References Cited

U.S. PATENT DOCUMENTS 1,261,053  4/1918  O'Brien .................................. 74/603
3,590,208  6/1971  Martini .......................... 29/609 UX

FOREIGN PATENT DOCUMENTS 16854 of 1886 United Kingdom .................. 74/598

*Primary Examiner*—Kenneth Dorner
*Attorney, Agent, or Firm*—Donald D. Mon

[57] ABSTRACT

A crankshaft with a laminated counterweight. The counterweight comprises a plurality of substantially flat plates, each of which has a first and a second shaft mounting hole therethrough, and at least one depression on one side and a boss on the other side. The plates are identical and are pressed together so that the bosses enter the depressions. Shafts are pressed into the aligned first and second holes, and an integral fully aligned torque resistant counterweight and crankshaft results.

6 Claims, 6 Drawing Figures

U.S. Patent    Aug. 3, 1982    4,342,236
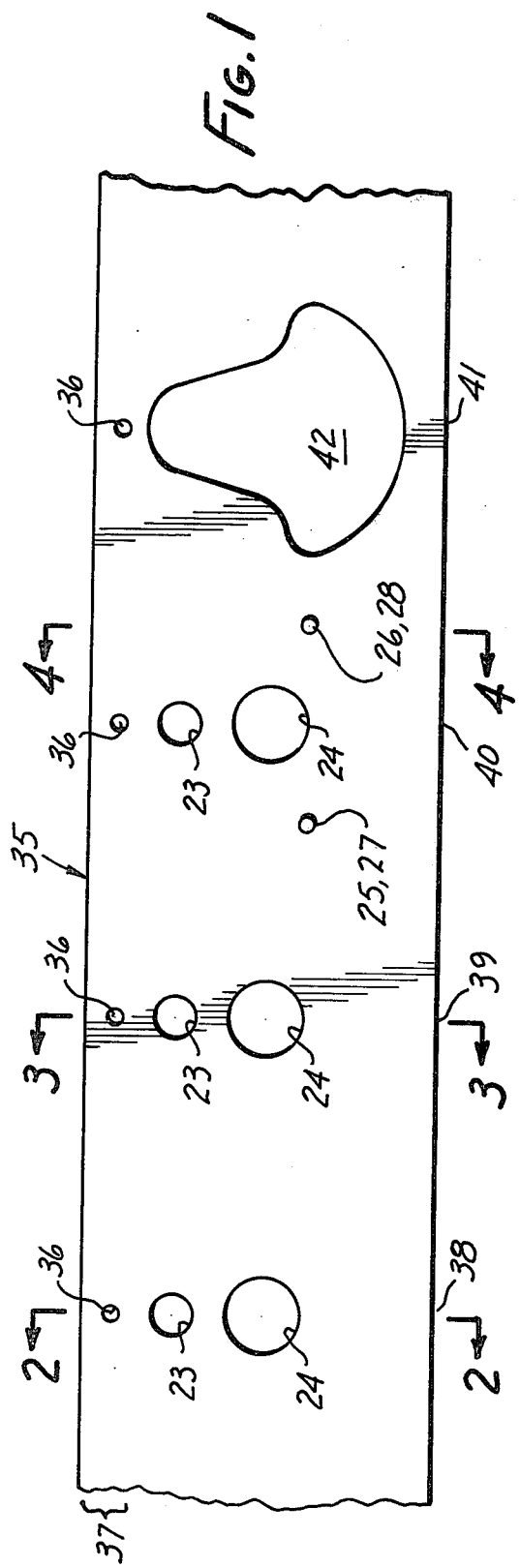
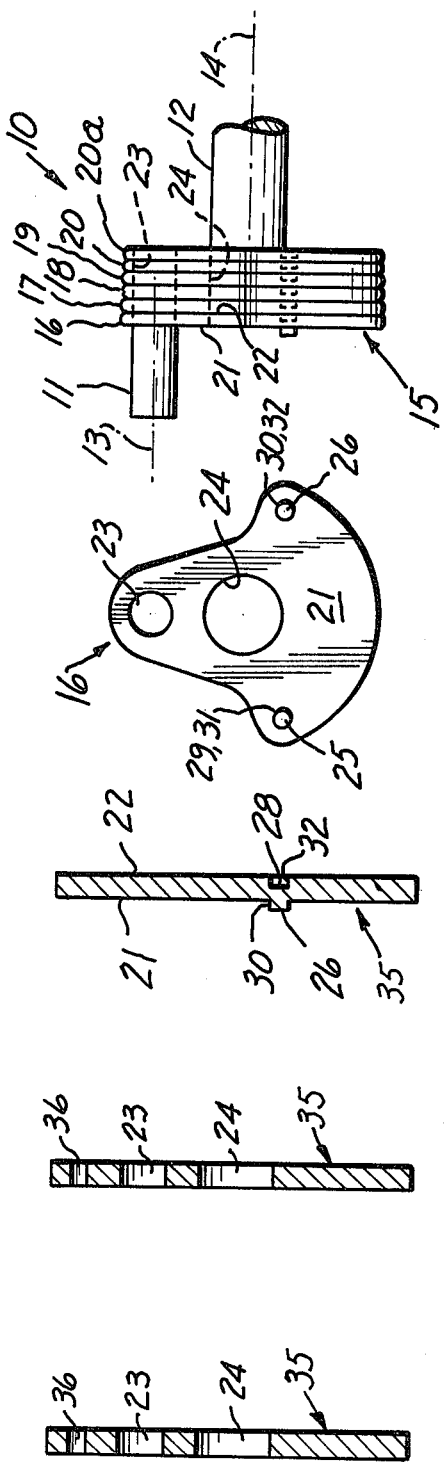

CRANKSHAFT WITH LAMINATED COUNTERWEIGHT

CROSS REFERENCE TO OTHER APPLICATION

This is a continuation of applicant's copending U.S. patent application, Ser. No. 946,216, filed Sept. 27, 1978, entitled "Crankshaft With Laminated Counterweight" now abandoned.

This invention relates to a crankshaft with a laminated counterweight.

Counterweights for crankshafts are usually made of a single heavy body of metal. For lighter, less expensive engines, the use of laminations for the counterweight could provide important savings. However, the torque to which a stack of laminations would be subjected in operation imposes severe limitations on the utility of such an arrangement. It is an object of this invention to provide a torque-resistant laminated counterweight for a crankshaft which can be manufactured and assembled with simple punch and press operations.

A device according to this invention is much less expensive than conventional crankshafts with counterweights. To build a device for one well-known small-horsepower engine costs a minor fraction of the cost to build a conventional device. In addition, a remarkably improved device is obtained.

A crankshaft according to this invention includes a stack of substantially flat plates held rotationally aligned by interengaging bosses and depressions, and a pair of shafts fitted in two offset holes through the stack. Each said offset hole constitutes a group of axially aligned mounting holes in the individual plates.

The above and other features of this invention will be fully understood from the following detailed description and the accompanying drawings, in which:

FIG. 1 shows a step-by-step process to form the plates used in this invention;

FIGS. 2, 3 and 4 are cross-sections taken at lines 2—2, 3—3 and 4—4, respectively in FIG. 1;

FIG. 5 is a plan view of a plate formed by the process of FIG. 1; and

FIG. 6 is a side view of a crankshaft according to the invention.

The presently preferred embodiment of the invention is shown in FIG. 6. There is illustrated a crankshaft 10 according to the invention. The crankshaft includes a first shaft 11 and a second shaft 12 whose axes 13, 14 are parallel to and offset from one another.

The counterweight 15 comprises a stack of identical plates, in this case example six, which are numbered 16, 17, 18, 19, 20, and 20a. Because they are all identical, only plate 16 will be described in detail. As best shown in FIGS. 4 and 5, it comprises a flat plate with a first and a second side 21, 22.

First and second shaft mounting holes 23, 24 are formed which extend between the two sides. On side 21 there are formed a pair of bosses 25, 26. On the other side there are formed a pair of depressions 27, 28. These are formed by punching operations as will later be described. They are preferably made circular. Accordingly, bosses 25 and 26 preferably have boundary walls 29, 30 which are circular and are also substantially cylindrical. They will be made as close to cylindrical as possible. Similarly, the depressions have boundary walls 31, 32 which are circular and substantially cylindrical, departing from a pure cylinder only by the amount necessary to enable the part to be separated from the die which forms it. The relative dimensions of the boundary walls of the bosses and of the depressions are such that the bosses make a tight fit (at least a net fit) in the depressions of the neighboring plate. A pressed interference fit is to be preferred, but a net fit is also useful.

It will be seen that the identical plates are aligned by the bosses and the depressions and that the first and second holes will also fall in line so that the stack is readily assembled.

The entire construction can readily be made by punching and pressing operations. For example, in FIG. 1 there is shown a convenient process for forming the plates. It starts with a metal sheet 35 which may be a strip so that the plates can be made in progressive dies. The metal sheet has an index hole 36 formed in an upper part 37 of the sheet which will not form part of the plate when it is completed.

At a first station 38, the index hole and the first and second holes 23, 24 are punched. The strip is then moved to second station 39, where the index hole is used to locate the first and second holes, and then their walls are sized or burnished as appropriate.

Next the strip proceeds to third station 40, where again the work is located by means of the index hole. Here the depressions and bosses are formed by a die-punching stamping operation.

Thereafter, the strip is moved to the fourth station 41 where a blanking die (not shown) punches a completed plate out from the sheet, leaving a void 42.

The completed plate is shown in FIG. 5.

Thereafter, the stack of plates is assembled and placed together. Either at the same time or later the cylindrical portions of the two shafts are pressed into the respective holes. The shafts should make at least a net fit, and preferably will make an interference fit, whereby the entire device is optimally held together.

The shafts could be appropriately shouldered and headed to hold the counterweight together, but the interference fit is sufficient and less expensive.

It will be observed that the rotational angular alignment of the plates is dependent principally on the interengagement of the bosses and depressions. These are relatively short stubby bosses, and they are too short to bend appreciably. Therefore, the stack is rugged, stiff, and resistive to torque deformation. The stack has been manufactured by inexpensive techniques, without requiring fastening means. In a preferred embodiment of the invention, the material of the plates is carbon steel 1010 drawn hard. In one known device there are five or six plates, each of them being about 0.085 inches thick.

It is further to be observed that the bottom of each depression is located between the sides of the plate at a spacing from the side from which the boss projects. This leaves a substantial shear web between the two sides, between the bottom of the depression and the base of the boss.

This invention is not to be limited by the embodiment shown in the drawings and described in the description, which is given by way of example and not of limitation but only in accordance with the scope of the appended claims.

I claim:

1. A crankshaft with a laminated counterweight, comprising:
   a stack of a plurality of identical, pressed together, substantially flat plates, each plate having a first and a second shaft mounting hole therethrough, at least one depression in one side, and at least one boss projecting as a stud from and integral with the other side, said depression and boss of each plate being coaxially aligned with each other, said depression and said boss of each plate being coaxially aligned with each other, said depression and said boss being peripherally bounded by geometrically similar walls which extend substantially normal to the sides of said plate, the bottom of said depression being located between said sides at a spacing from the side from which said boss projects, whereby to leave a substantial shear web between said two sides, between the bottom of said depression and the base of said boss, said plates being stacked parallel to one another, with the boss of one plate in the depression of its neighbor plate and making a net or tighter fit, all of said first holes being coaxial, and all of said second holes being coaxial;

a first shaft tightly fitted in said first holes and projecting from a first side of the stack; and a second shaft tightly fitted in said second holes, and projecting from a second side of the stack.

2. A crankshaft according to claim 1 in which said peripheral walls of the bosses and depressions are circular and substantially cylindrical.

3. A crankshaft according to claim 1 in which the depressions and the bosses are formed by a stamping operation.

4. A crankshaft according to claim 1 in which each plate has two depressions and two bosses.

5. A crankshaft according to claim 4 in which the depressions and bosses are formed as two pairs, with the depressions and bosses of each pair axially aligned with one another.

6. A crankshaft according to claim 1 in which the shaft makes a pressed interference fit in the respective holes, and in which the bosses make a pressed interference fit in the respective depressions.

* * * * *